(12) United States Patent
Cazzolla et al.

(10) Patent No.: US 7,739,350 B2
(45) Date of Patent: Jun. 15, 2010

(54) VOICE ENABLED NETWORK COMMUNICATIONS

(75) Inventors: John J. Cazzolla, Lake Worth, FL (US); Reza Ghasemi, Pompano Beach, FL (US); Walter Haenel, Holzgerlingen (DE); Joseph A. Hansen, Coral Springs, FL (US)

(73) Assignee: International Business Machines Corporation, Armonk, NY (US)

( * ) Notice: Subject to any disclaimer, the term of this patent is extended or adjusted under 35 U.S.C. 154(b) by 1132 days.

(21) Appl. No.: 10/732,085

(22) Filed: Dec. 10, 2003

(65) Prior Publication Data

US 2005/0132023 A1 Jun. 16, 2005

(51) Int. Cl.
G06F 15/16 (2006.01)
G06F 15/173 (2006.01)
G06F 12/00 (2006.01)

(52) U.S. Cl. .......................... 709/217; 709/224; 726/4; 726/21

(58) Field of Classification Search ................. 709/217, 709/227, 224; 379/88.17, 88.18
See application file for complete search history.

(56) References Cited

U.S. PATENT DOCUMENTS

| | | | |
|---|---|---|---|
| 6,026,087 A | 2/2000 | Mirashrafi et al. | |
| 6,047,178 A * | 4/2000 | Frlan | 455/423 |
| 6,144,667 A | 11/2000 | Doshi et al. | |
| 6,307,880 B1 * | 10/2001 | Evans et al. | 375/222 |
| 6,430,175 B1 | 8/2002 | Echols et al. | |
| 6,519,246 B1 * | 2/2003 | Strahs | 370/352 |
| 6,606,708 B1 * | 8/2003 | Shifrin et al. | 726/8 |
| 6,711,618 B1 * | 3/2004 | Danner et al. | 709/228 |
| 6,741,853 B1 * | 5/2004 | Jiang et al. | 455/418 |
| 6,807,529 B2 * | 10/2004 | Johnson et al. | 704/270.1 |
| 6,842,767 B1 * | 1/2005 | Partovi et al. | 709/203 |
| 6,948,129 B1 * | 9/2005 | Loghmani | 715/751 |
| 6,996,397 B2 * | 2/2006 | Fraser et al. | 455/426.1 |
| 7,092,370 B2 * | 8/2006 | Jiang et al. | 370/329 |
| 7,200,142 B1 * | 4/2007 | Loghmani | 370/353 |
| 7,254,227 B2 * | 8/2007 | Mumick et al. | 379/215.01 |
| 7,289,606 B2 * | 10/2007 | Sibal et al. | 379/52 |
| 2002/0015480 A1 * | 2/2002 | Daswani et al. | 379/88.17 |
| 2002/0035474 A1 * | 3/2002 | Alpdemir | 704/270 |
| 2002/0055350 A1 * | 5/2002 | Gupte et al. | 455/412 |
| 2002/0136226 A1 * | 9/2002 | Christoffel et al. | 370/401 |
| 2003/0051037 A1 * | 3/2003 | Sundaram et al. | 709/227 |
| 2003/0115267 A1 * | 6/2003 | Hinton et al. | 709/204 |
| 2003/0182622 A1 * | 9/2003 | Sibal et al. | 715/511 |
| 2004/0153565 A1 * | 8/2004 | Bloch et al. | 709/232 |
| 2005/0021826 A1 * | 1/2005 | Kumar | 709/232 |
| 2005/0091539 A1 * | 4/2005 | Wang et al. | 713/201 |
| 2005/0108574 A1 * | 5/2005 | Haenel et al. | 713/201 |

FOREIGN PATENT DOCUMENTS

CN 1303198 A 7/2001

* cited by examiner

*Primary Examiner*—Jeffrey Pwu
*Assistant Examiner*—Guang Li
(74) *Attorney, Agent, or Firm*—Novak Druce + Quigg

(57) ABSTRACT

A method of communicating with a remote user. The method can include receiving a plurality of server requests from the remote user via a communications network. The plurality of server requests can be processed in a single user session without re-authenticating the user, and can include at least one server request that includes voice data and at least one server request that includes non-audio data. A portlet can be provided to process the voice data and the non-audio data server requests. Responsive to the server requests, data can be provided to the remote user via the communications network.

8 Claims, 3 Drawing Sheets

VOICE ENABLED NETWORK COMMUNICATIONS

BACKGROUND OF THE INVENTION

1. Technical Field

This invention relates to the field of network communications, and more particularly, to voice enabled network communications.

2. Description of the Related Art

A portal is a web site that proposes to be a major starting site for users when the users connect to the World Wide Web (Web). For instance, many browsers connect to a portal by default and a large number of access providers offer portals to the Web for their own users. Such portals are typically accessible using computers or similar devices having a graphical user interface (GUI) based web browser.

Expanding access to the Web, voice portals have been developed which offer voice applications that take advantage of features provided by portal servers. For example, one can place a voice call via a telephone and access a voice portal, typically by authenticating to a voice portal server. Such voice portals often provide to voice callers information that is also available to conventional GUI based web browsers via the Internet. In some respects, accessing the information via a voice portal can be a more pleasant experience than using a GUI, especially when complex menu navigation is required to retrieve the information.

Currently, however, users cannot in a single user session switch between voice and web views. Thus, users cannot easily take advantage of the voice mode of a portal while simultaneously accessing the portal using a conventional web browser.

SUMMARY OF THE INVENTION

The invention disclosed herein relates to a method of communicating with a remote user. The method includes the step of receiving a plurality of server requests from the remote user via a communications network, for example over a Hypertext Transfer Protocol (HTTP) communication link. Responsive to the server requests, data can be provided to the remote user via the communications network. Notably, the plurality of server requests can be received without requiring the user to be re-authenticated. A portion of the data provided to the remote user can be formatted using with a voice markup language such as Voice Extensible Markup Language (VXML).

The plurality of server requests can include at least one server request that includes voice data and at least one server request that includes non-audio data. The server request that includes voice data and the server request that includes non-audio data can be processed in a single user session. For example, the method can further include the step of receiving user credentials with each of the server requests. The user credentials can be common for voice data and non-audio data received from a particular user.

A portlet can be provided to receive the server request that includes voice data. The portlet also can receive the server request that includes non-audio data. The portlet can be operatively connected to the communications network.

The present invention also relates to a system for communicating with a remote user over a communications network. The system can including a device monitor which receives in a single user session a plurality of server requests from the remote user via the communications network. The plurality of server requests can include at least one server request that includes voice data and at least one server request that includes non-audio data. In one arrangement, the non-audio data and the voice data can be received over a HTTP communications link.

A non-audio data aggregator can be provided for processing non-audio data received from the remote user. Further, a voice aggregator can be provided for processing voice data received from the remote user. The non-audio data aggregator and the voice data aggregator each can forward respective processed data to a common portlet, for instance a portlet which processes both non-audio and voice data.

The non-audio data aggregator also can forward non-audio data to the remote user and the voice aggregator can forward audio data to the remote user. The audio data forwarded to the remote user can be formatted using a voice markup language such as VXML.

The present invention also can be embodied as a system having means for performing the various steps disclosed herein as well as a machine readable storage for causing a machine to perform the steps described herein.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

Figure 1:
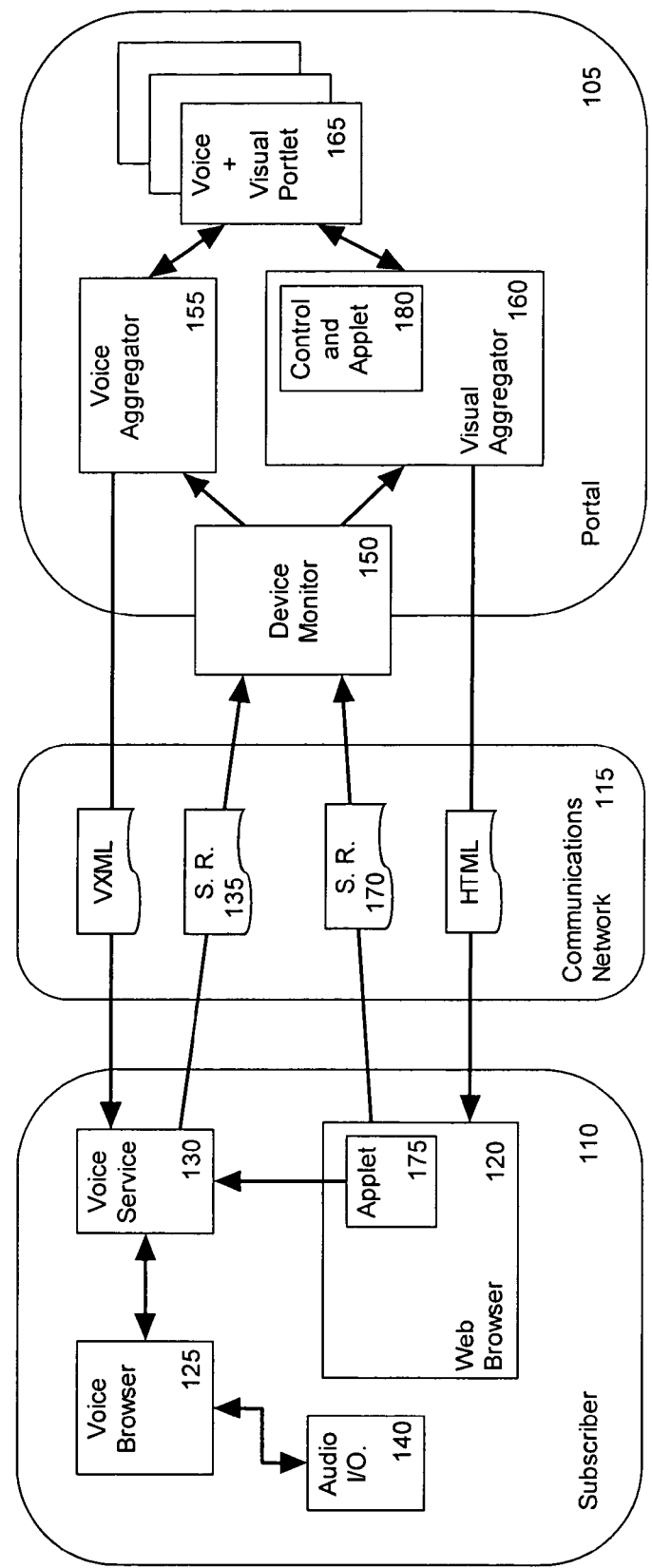
FIG. 1 is a schematic diagram of an exemplary system which is useful for understanding the present invention.

An embodiment in accordance with the present invention relates to a voice enabled portal which can support, in a single user session, voice communication in addition to a non-audio communication. Thus, a user can communicate with the portal using both voice and non-audio server requests. Referring to FIG. 1, an exemplary system 100 having a voice-enabled portal 105 is shown.

A subscriber 110 can communicate with the portal 105 via a communications network 115, for example a wide area network (WAN), a local area network (LAN), the Public Switched Telephone Network, wireless and mobile networks, or the Internet. The subscriber can be a computer, a personal digital assistant (PDA), an Internet appliance, or any other processing device that can be used to browse content sources on the communications network 115. The subscriber 110 can include a user interface. The user interface can include, for example, a web browser 120 and a voice browser 125. The subscriber also can include a voice service 130. The voice service 130 can start the voice browser 125 and direct it to the portal 105.

The voice service 130 also can be used as a proxy server for server requests 135 and add credentials, such as user information, to the server requests 135. For example, in one embodiment, the credentials can be stored in cookies which are passed with the server requests 135. Further, the voice service 130 can add a navigational state as a parameter to the server requests 135. The navigational state can be, for example, a current container path (places and pages) and a portlet name. To allow the portal 105 to detect a client change, the voice service 130 can augment the server request 135 with client information, such as a user agent string.

The subscriber 110 also can include an audio input/output (I/O) device(s) 140 interfaced with the voice browser 125. For example, the audio I/O device(s) 140 can include at least one audio transducer for receiving spoken utterances, and at least one audio transducer for generating an acoustic output. For instance, the audio I/O device(s) 140 can include a microphone, headphones and/or loudspeakers. The I/O devices(s) 140 can be interfaced with the voice browser 125 via a suitable audio processor.

The portal 105 can be operatively connected to an application server (not shown) and a data store (not shown). The portal 105 can include a device monitor 150, a voice aggregator 155, a visual aggregator 160, and voice/visual portlets 165. Portlets typically are user-facing, multi-step interactive modules that can be plugged into portals and other web applications. Portlets sometimes are used to generate web fragments that can be assembled by portals into complete pages. The voice/visual portlets 165 of the present invention, however, are not limited to visual presentation modules. Rather, the portlets 165 also can present and process audio information integral to web pages. For example, the portlets 165 can receive server requests 135 which can be generated from spoken utterances and server requests 170 which can be generated from keyboard entered data and/or pointer selections.

The portlets 165 provide visual data responsive to server requests 170 and voice data responsive to server requests 135 received from the subscriber 110. The visual and voice data from the portlets 165 can be forwarded to the visual aggregator 160 and the voice aggregator 155, respectively, which can format the data for transmission to the subscriber 110.

After formatting the voice data received from the portlets 165, the voice aggregator 155 can provide the voice data to the voice service 130. The voice data can be formatted to generate audio that approximates a human voice, for example using Voice Extensible Markup Language (VXML) or any other data format suitable for generating voice-like audio. The visual aggregator 160 can provide to the web browser 120 data received from the portlets 165 which is to be presented in a format that the web browser 120 can process. For example, the visual aggregator 160 can present the data in a Hypertext Markup Language (HTML) format.

In operation, a user session can be established by sending a server request from the subscriber 110 to the portal 105. For example, a server request 170 can be sent from the web browser 120 to the device monitor 150. Responsive to the request 170, one or more portlets specified by the request 170 can be served, for example portlets forming a Web page. The visual aggregator 160 can include an insertion component, which includes one or more controls and applets, into the response to indicate that voice communication is supported and to provide a means for activating the voice service.

Once displayed in the Web browser 120, the user can activate this control thereby causing the Web browser 120 to activate the applet 175. The Applet 175 provides the navigational state of the portlet and user credentials to the voice service 130. The navigational state can be specified as the current container path (places and pages) and the portlet name. As noted, the credentials can be passed to the portal using cookies or any other suitable data transfer technique. The voice service 130 then can activate or execute the voice browser 125.

The device monitor 150 can receive server requests 135, 170 from the subscriber 110. The device monitor 150 can monitor for client changes before the portal begins its main processing. For example, the device monitor 150 can monitor for changes in a user agent string to determine when server requests 135 generated by the voice service 130 are received in place of server requests 170 generated by the web browser 120. Upon detecting this client change, the device monitor can copy the current (non-voice) session and modify the client information in the session so that the server requests 135 from the voice service 130 are processed in the same user session as the server requests 170 from the web browser 120. The copy of the user session information, representing the state of the visual session, can be stored in a database and referenced by the session identifier (ID) and the communication type (visual in this case), or can be stored in a data structure in the current session, which is marked as inactive. That is, the active session is modified to indicate that the requester can support voice markup language, in this case VXML, interactions.

The active session information can be used as long as the user interacts in the same mode (voice or visual). When the user switches from one mode to another, an additional copy step can be performed. When switching from voice to visual, for example, the current voice session state can be stored and the visual state restored. When switching from visual to voice again, the system can detect the inactive copy of the voice state and restore it in the session, while backing up the visual state. Thus, both voice communication and non-audio communication can be used in a single user session without requiring the user to be re-authenticated.

Based upon data contained in the user agent string, the device monitor 150 can determine whether a server request 135, 170 should be forwarded to the voice aggregator 155 or the visual aggregator 160. The aggregators 155, 160 can use the navigational data contained in the server requests 135, 170 to select a correct portlet 165 for presentation to a user. Notably, the portlets 165 can process both voice 135 and non-audio server requests 170. Moreover, responsive to the server requests 135, 170, the portlets 165 can provide both data for presentation visually and data for presentation as voice audio. For example, portlet data that is to be presented as voice audio can be forwarded from the portlet 165 to the voice aggregator 155. The voice aggregator 155 can format the data for acoustic presentation, for example using VXML, and forward the formatted data to the voice service 130. Portlet data that is to be presented as visual data can be forwarded from portlet 165 to the visual aggregator 160, which can format the data for visual presentation, for example using HTML. The visual formatted data can be forwarded to the web browser 120. The control and applet insertion function of the visual aggregator 160 can check whether a portlet supports visual and/or voice output. In this case, the visual aggregator 160 can insert a visual control such as a push button located near or within the portlet output. If at least one such control is inserted into the response, the applet 175 also can be inserted.

Figure 2:
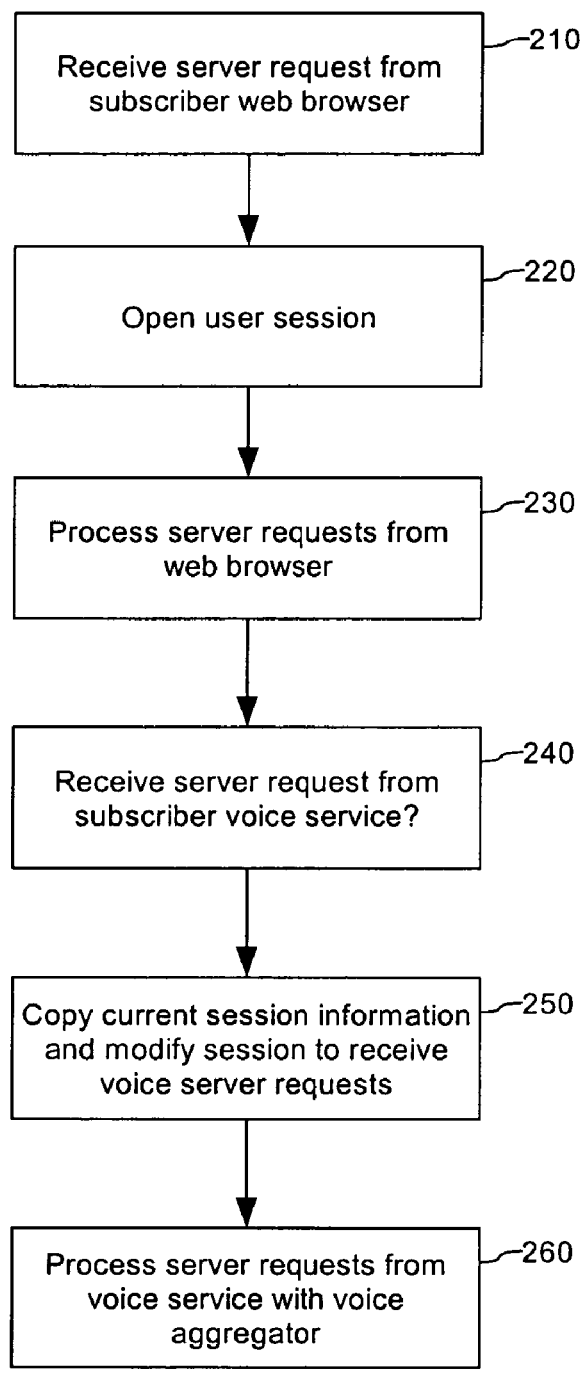
FIG. 2 is a flow chart which is useful for understanding the present invention.

Referring to FIG. 2, a flow chart 200 which is useful for understanding the present invention is shown. Beginning at step 210, the portal can receive a server request from the web browser of the subscriber. In response to the server request, a user session can be opened, as shown in step 220, and the portal can process subsequent server requests from the web browser, as shown in step 230. Proceeding to step 240, the portal can receive a server request from the subscriber voice service. At step 250, the current active user session information can be copied as previously described and the current user session can be modified to indicate support for voice markup language interactions. The server requests received from the voice service then can be processed using the voice aggregator.

Figure 3:
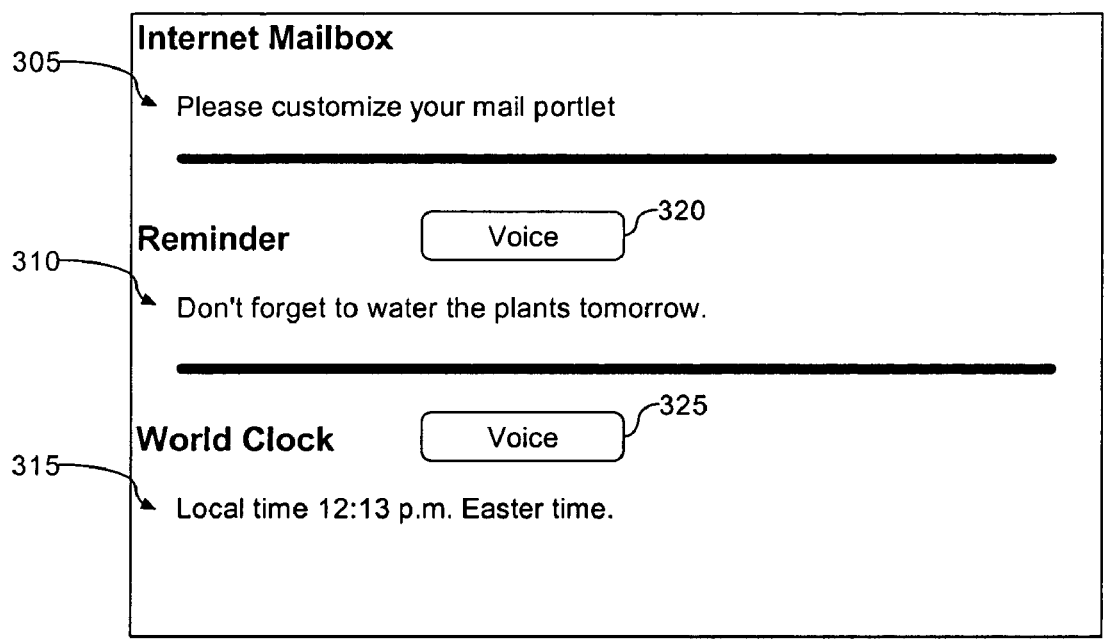
FIG. 3 is an exemplary Web page which can be provided to a user Web browser in accordance with one embodiment of the present invention.

FIG. 3 is an exemplary Web page 300 which can be provided to a user Web browser. As shown, the Web page 300 can include three individual portlets 305, 310, and 315. Portlet 305 provides e-mail functionality to the user. Portlet 310 provides one or more reminders as can be programmed by the user and portlet 315 provides a clock function. Notably, portlet 310 has an associated voice button 320 and portlet 315 has an associated voice button 325. The voice buttons 320 and 325 indicate that portlets 310 and 315 each can be voice and/or speech enabled.

Activation of either one of the voice buttons 320 or 325 allows the user to continue interacting with the Web page using the same session. That is, the user need not be re-authenticated as once either button is activated, a voice service and voice browser having speech recognition and text-to-speech functionality is activated in the user machine. Further, the portal with which the user is interacting copies the existing user session and modifies the data to indicate that the user now can interact using a speech or voice modality. Selection of either button can allow the user to access the corresponding portlets using speech rather than the visual buttons or both speech and the visual buttons.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program or application program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for a remote user to communicate with a voice enabled portal using both voice and non-voice server requests, the method comprising the steps of:
    establishing a single communications session by sending an initial server request from the remote user to the portal via a communications network, wherein the remote user is a subscriber having a web browser and a voice browser, and wherein the voice enabled portal includes a voice aggregator for formatting requested data as acoustic presentation and sending the formatted data to the voice browser and a visual aggregator for formatting requested data as visual presentation and sending the formatted data to the web browser;
    monitoring a mode of the single communications session established between the portal and the remote user, wherein the mode for the single communications session is a voice communications mode or a non-voice communications mode;
    during the established single communications session, receiving by the portal a subsequent server request from the remote user via the communications network, wherein the received subsequent server request comprises either voice data or non-voice data;
    responsive to the received subsequent server request, determining whether the current mode of the established single communications session is compatible with the received subsequent server request;
    if the current mode of the established single communications session is inappropriate for processing the received subsequent server request, copying and storing session information of the current mode and switching the mode of the communications session by restoring saved session information of the switched mode within the same communications session, wherein an authentication associated with the communications session in the current mode is used as an authentication for the communications session in the switched mode without requiring the user to be re-authenticated; and
    providing data responsive to the received subsequent server request to the remote user via the communications network.

2. The method of claim 1, further comprising the step of receiving user credentials with the initial server request, the user credentials being common for voice data and non-voice data received from a particular user.

3. The method of claim 1, further comprising the steps of:
    providing a portlet configured for receiving server requests comprising voice data; and
    operatively connecting the portlet to the communications network.

4. The method of claim 3, wherein the portlet is further configured to receive server requests comprising non-voice data.

5. The method of claim 1, said receiving step further comprising the step of receiving the server request over a hypertext transfer protocol (HTTP) communication link.

6. The method of claim 1, wherein a portion of the data provided to the remote user is formatted in accordance with a voice extensible markup language (VXML).

7. A system for a remote user to communicate with a voice enabled portal using both voice and non-voice server requests, comprising:
    at least one memory; and
    at least one processor configured to:
        establish a single communications session by sending an initial server request from the remote user to the portal via a communications network, wherein the remote user is a subscriber having a web browser and a voice browser, and wherein the voice enabled portal includes a voice aggregator for formatting requested data as acoustic presentation and sending the formatted data to the voice browser and a visual aggregator for formatting requested data as visual presentation and sending the formatted data to the web browser;
        monitor a mode of the single communications session established between the portal and the remote user, wherein the mode for the single communications session is a voice communications mode or a non-voice communications mode;
        during the established single communications session, receive by the portal a subsequent server request from the remote user via the communications network, wherein the received subsequent server request comprises either voice data or non-voice data;

responsive to the received subsequent server request, determine whether the current mode of the established single communications session is compatible with the received subsequent server request;

if the current mode of the established single communications session is inappropriate for processing the received subsequent server request, copy and store session information of the current mode and switch the mode of the communications session by restoring saved session information of the switched mode within the same communications session, wherein an authentication associated with the communications session in the current mode is used as an authentication for the communications session in the switched mode without requiring the user to be re-authenticated; and provide data responsive to the received subsequent server request to the remote user via the communications network.

8. A machine-readable storage having stored thereon, a computer program having a plurality of code sections, said code sections executable by a machine for causing the machine to perform the steps of:

establishing a single communications session by sending an initial server request from a remote user to a portal via a communications network, wherein the remote user is a subscriber having a web browser and a voice browser, and wherein the voice enabled portal includes a voice aggregator for formatting requested data as acoustic presentation and sending the formatted data to the voice browser and a visual aggregator for formatting requested data as visual presentation and sending the formatted data to the web browser;

monitoring a mode of the single communications session established between the portal and the remote user, wherein the mode for the single communications session is a voice communications mode or a non-voice communications mode;

during the established single communications session, receiving by the portal a subsequent server request from the remote user via the communications network, wherein the received subsequent server request comprises either voice data or non-voice data;

responsive to the received subsequent server request, determining whether the current mode of the established single communications session is compatible with the received subsequent server request;

if the current mode of the established single communications session is inappropriate for processing the received subsequent server request, copying and storing session information of the current mode and switching the mode of the communications session by restoring saved session information of the switched mode within the same communications session, wherein an authentication associated with the communications session in the current mode is used as an authentication for the communications session in the switched mode without requiring the user to be re-authenticated; and providing data responsive to the received subsequent server request to the remote user via the communications network.

* * * * *